Figure 16:
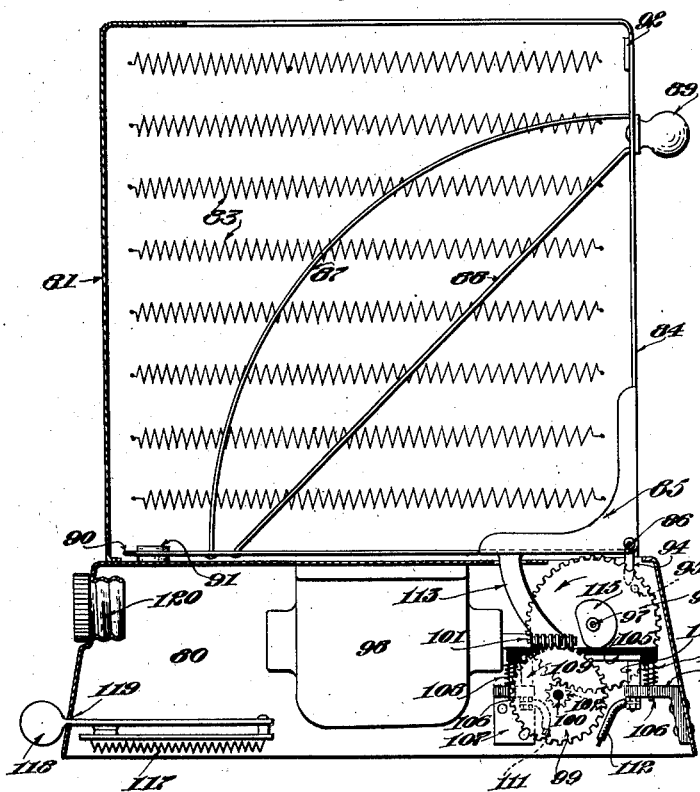

July 17, 1934.  G. L. LAWRENCE  1,967,209
TOASTER FOR BREAD AND THE LIKE
Filed Dec. 12, 1927   6 Sheets-Sheet 1
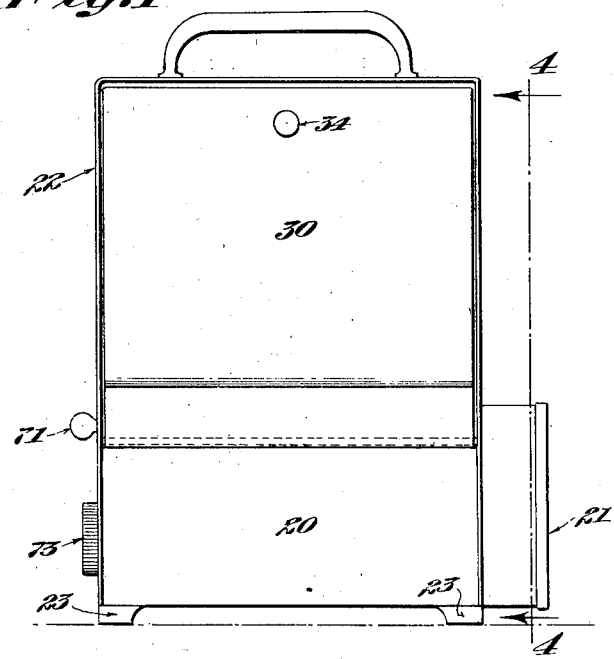
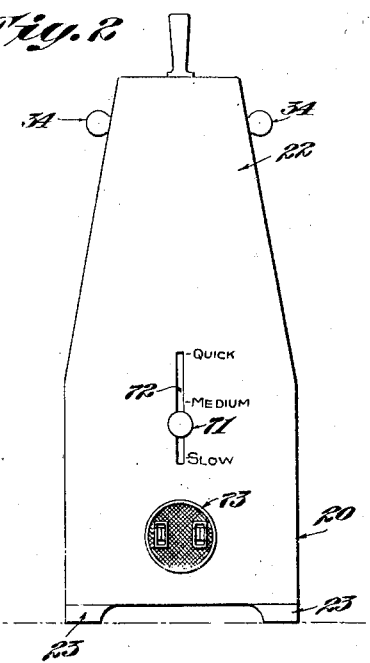
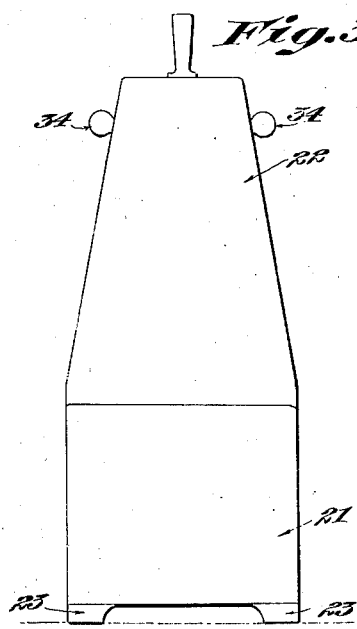
Inventor
George L. Lawrence
By Francis W. Dakin atty July 17, 1934.  G. L. LAWRENCE  1,967,209
TOASTER FOR BREAD AND THE LIKE
Filed Dec. 12, 1927   6 Sheets-Sheet 2
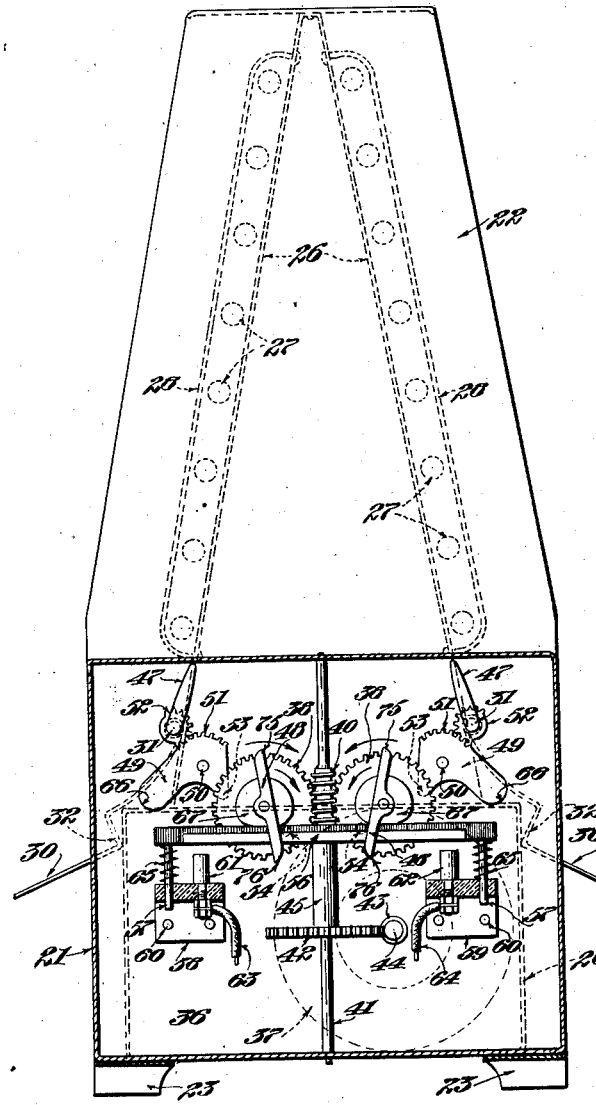
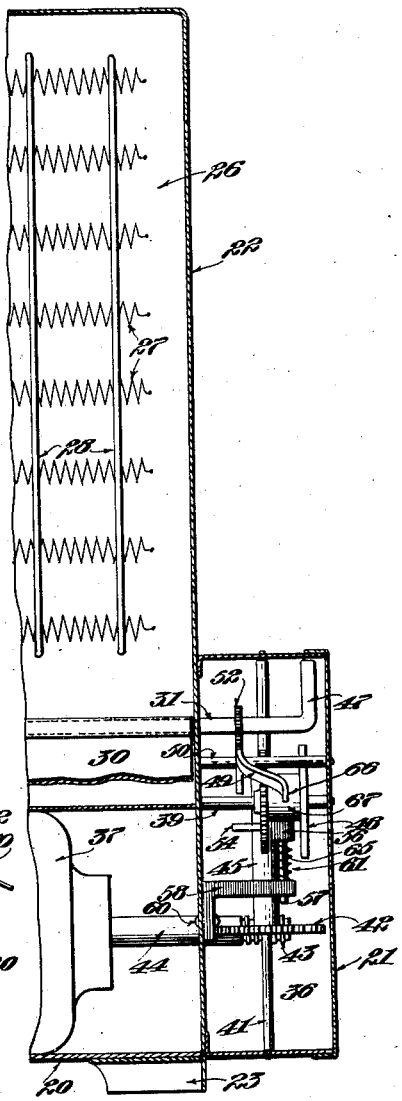

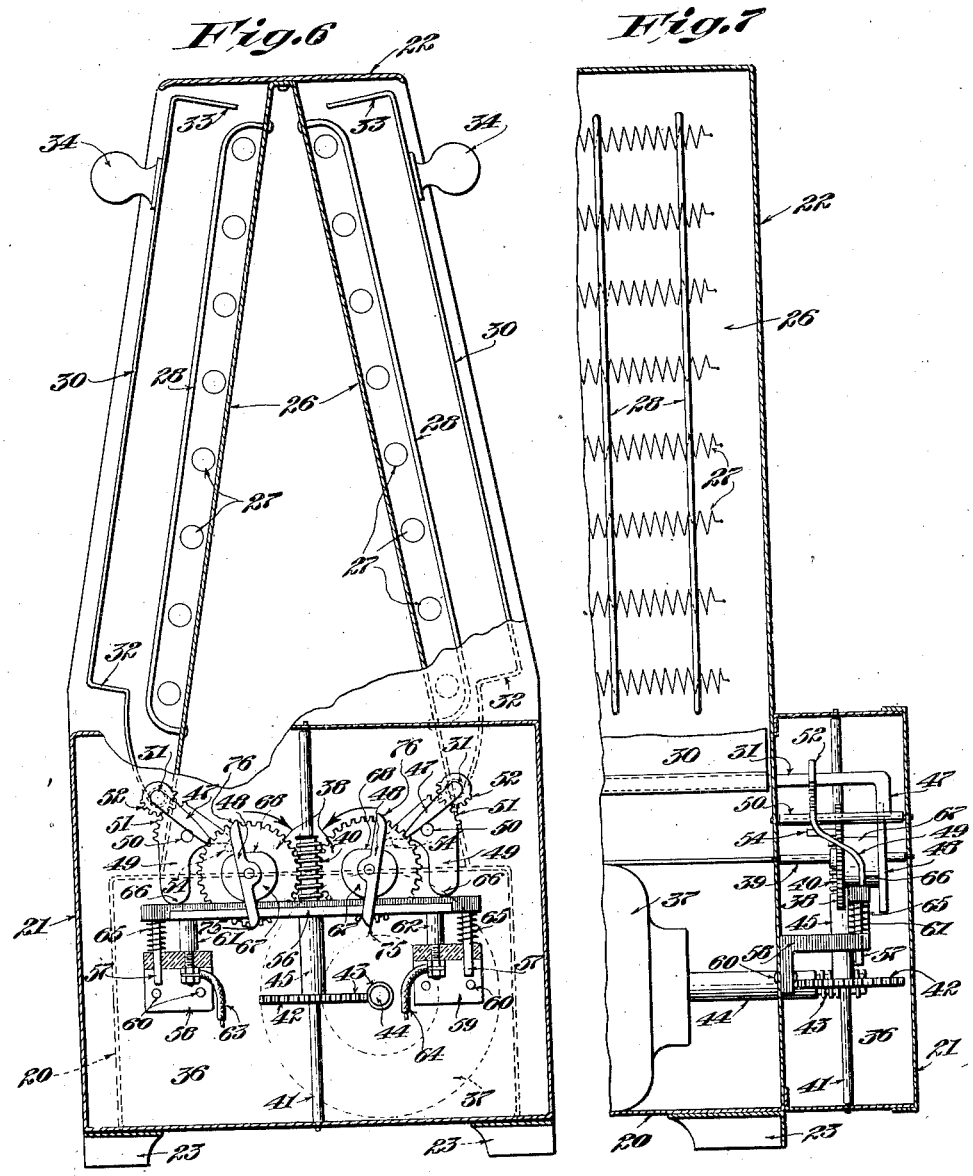

July 17, 1934.   G. L. LAWRENCE   1,967,209
TOASTER FOR BREAD AND THE LIKE
Filed Dec. 12, 1927   6 Sheets-Sheet 4
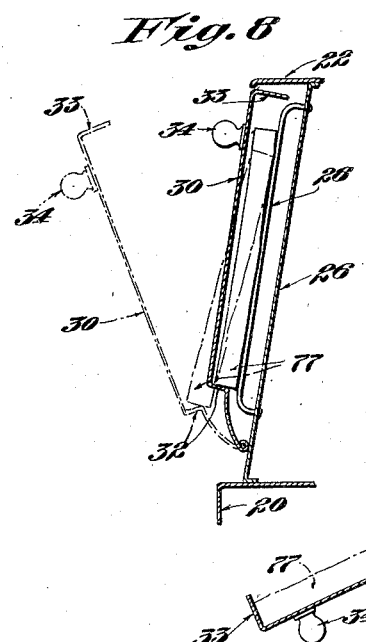
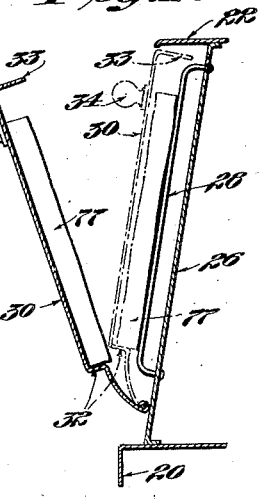
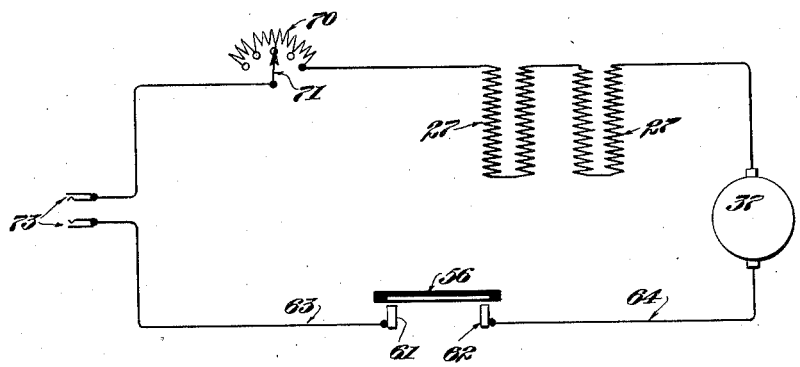
Inventor
George L. Lawrence
By Francis P. Dakin
Atty July 17, 1934.  G. L. LAWRENCE  1,967,209
TOASTER FOR BREAD AND THE LIKE
Filed Dec. 12, 1927   6 Sheets-Sheet 5
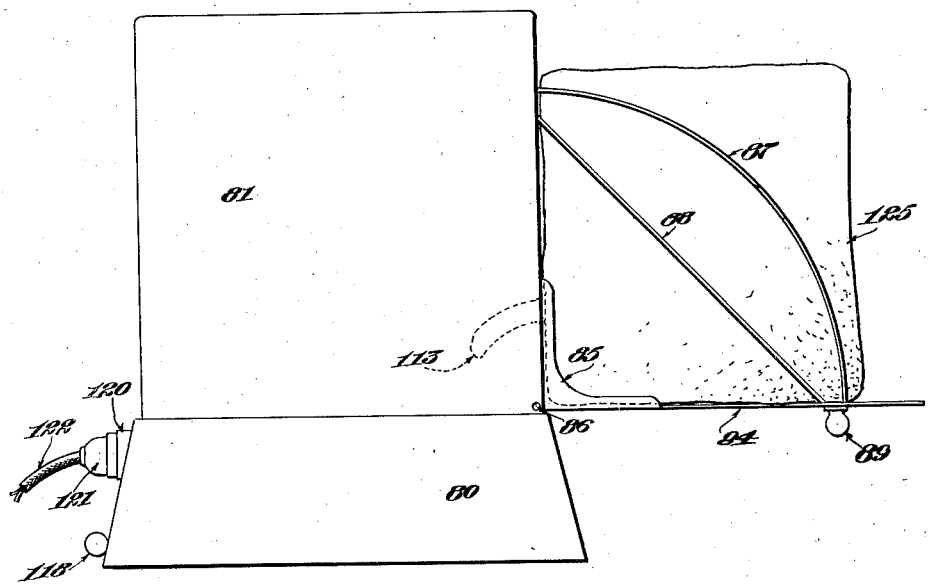
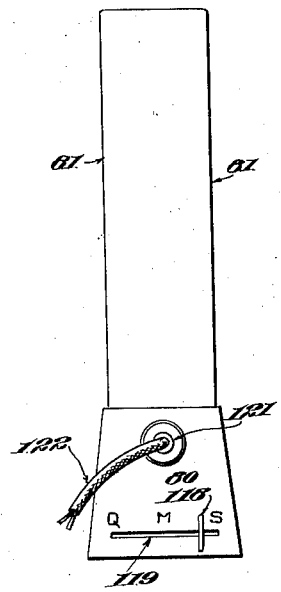
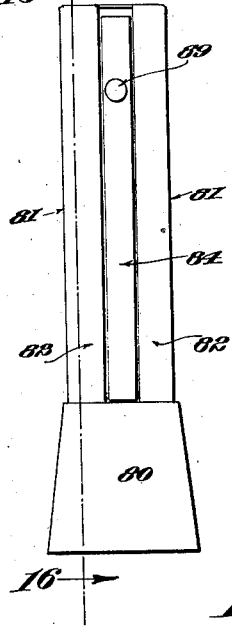
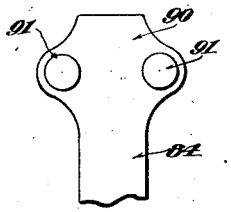
Inventor
George L. Lawrence
By Francis W. Dakin Atty Patented July 17, 1934

1,967,209

UNITED STATES PATENT OFFICE 1,967,209

TOASTER FOR BREAD AND THE LIKE

George L. Lawrence, Melrose, Mass., assignor, by mesne assignments, to Waters Genter Company, Minneapolis, Minn., a corporation of Minnesota Application December 12, 1927, Serial No. 239,500

15 Claims. (Cl. 219—19)

The present invention relates to a device for toasting bread and other food products and more particularly to a device of this character adapted to be operated automatically by electricity.

The preparation of toasted bread in the home is generally a prolific source of irritation to the housewise because the multiplicity of duties which attend the preparation of a meal prevents the close attention which toasting requires with the frequent result that the bread is improperly toasted or burned. Various attempts have heretofore been made to devise automatic toasters but the results have not been entirely satisfactory. In some cases, clock springs have been employed for moving the food out of the toasting position after a predetermined lapse of time, but such devices require a preliminary winding of the spring in each toasting operation and are difficult to regulate to secure uniform operation or to suit varying conditions in the material toasted or in the results desired.

The main object of my invention is the provision of a toaster which is entirely automatic in its operation after the bread or other food has been placed in toasting position.

To this end, one feature of the invention is to provide a construction comprising a toasting element electrically heated with suitable means for supporting the food, said means being adapted to close the heating circuit when moved into toasting position, together with a motor for moving the supporting means out of toasting position, at the conclusion of the toasting operation. The placing of the food in toasting position starts the toasting operation and no further attention is required except to remove the food at any time after it has been toasted.

Another object of the invention is the provision of simple and effective means for varying the range of the toasting operation in accordance with varying conditions of the food and to attain various results.

The amount of toasting required varies with the kind of food, its freshness and thickness and the taste of the consumer and one feature of my invention contemplates the provision of means for controlling the heating or toasting circuit to effect this end. Preferably, a rheostat or resistance coil is introduced into the toasting circuit with means of control, such as a lever, capable of being operated without appreciable expenditure of time and effort.

A further object of the invention is the provision of means for automatically turning the toast to subject the two sides thereof in turn to the toasting operation. To this end, one feature of the invention resides in the provision of means for moving the food support out of toasting position when one side of the food has been toasted and for returning it to toasting position immediately, the food support being so constructed that this operation through the force of gravity reverses the food on the support and on its return, the other side is presented for toasting. Means are also provided for holding the heating circuit closed while the turning operation is occurring.

Other objects of the invention will be more specifically set forth and described hereinafter.

My invention is capable of embodiment in various forms of toasters and two forms are shown in the drawings and described hereinafter, the first and preferred form being adapted to toast two slices of bread simultaneously with means for reversing the bread to toast both sides and the other form being adapted for toasting one slice on both sides simultaneously. The toasting operation in the preferred double form takes longer but produces twice the quantity of toast and requires attention only one half as often as the single form. This is of advtange because toast is generally prepared at a time when the attention of the person preparing the meal is required elsewhere.

Figure 17:
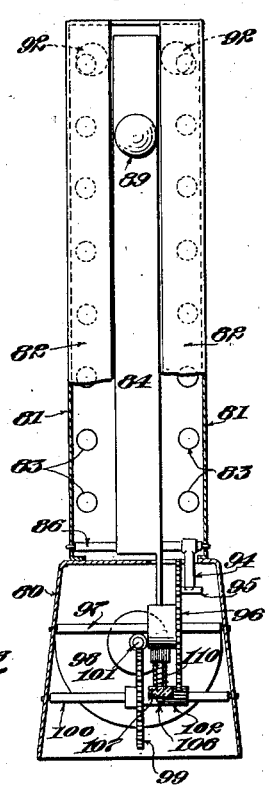
Figure 18:
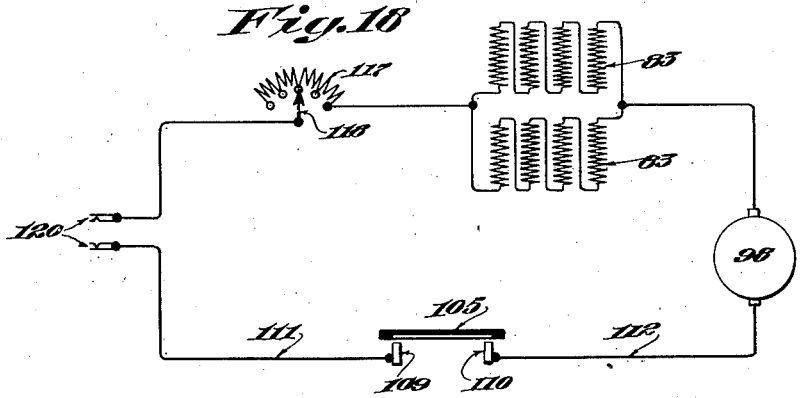

In the accompanying drawings illustrating the invention, Figure 1 is a side elevation of a double toaster constructed and adapted for operation in accordance with my invention; Fig. 2 is an end elevation of the same looking from left to right in Fig. 1; Fig. 3 is another end elevation of the same looking from the opposite direction in Fig. 1; Fig. 4 is an end elevation on an enlarged scale with the end plates removed or broken away to expose the working parts which are shown in starting position with the food supports in open position; Fig. 5 is a front elevation of the end portion shown in Fig. 4 with the front plates removed; Fig. 6 is a view similar to Fig. 4 but showing the position of the parts just after the toast has been turned; Fig. 7 is a view similar to Fig. 5 with the parts in the position of Fig. 6; Figs. 8, 9, and 10 are diagrammatic views showing successive positions of a food support and the toast to illustrate the operation of reversing the toast in the support; Fig. 11 is a wiring diagram for the double toaster; Fig. 12 is a side elevation of a single toaster constructed in accordance with my invention; the food support being shown in loaded but inoperative position; Fig. 13 is an end elevation of the same looking from left to right in Fig. 2; Fig. 14 is an opposite end elevation with the food support in toasting position; Fig. 15 is a detail plan view of a portion of the food-support; Fig. 16 is a central longitudinal sectional view of the frame of the single toaster showing the food support and operating parts in elevation and in operative position; Fig. 17 is an end elevation of the same with a portion of the frame broken away to expose the operating parts and Fig. 18 is a wiring diagram for the single toaster.

Referring to the drawings, more particularly Figs. 1 to 11 inclusive illustrating a double toaster embodying my invention, there is shown a frame comprising a rectangular base portion 20 and a box-like casing 21 mounted on one end of the base. The two ends of the base are extended upwardly and joined together by a top piece to form an open frame 22 above the base. Angular foot pieces 23 are affixed to the bottom corners of the base portion for supporting it in a slightly raised position but the frame as a whole may be made in any suitable form.

Extending upwardly from the top of the base portion are two converging plates 26 which are secured to the top piece of the open frame 22 and serve as supports for two sets of electric heating coils 27 and also for grids 28 for preventing the toast from contacting the coils. Two food-supports 30 are positioned, one on each side of the pair of plates 26, each support being rigidly fastened to a pivot rod 31 loosely mounted in the end plates of the frame for permitting the supports to be turned freely into and out of operative position. Each support 30 is preferably in plate form but may, if desired, be in grid form and is formed with a shelf 32 for supporting the food when in approximately vertical operative position (Fig. 6) and with an inwardly turned top end flange 33 to retain the food within the support when it is in an inoperative position (Fig. 4). A non-heat absorbing knob 34 is fastened to each support to permit manual operation thereof when necessary.

For operating the food supports for the purpose of turning the toast and for removing it from the heating coils at the conclusion of the toasting operation, I provide means arranged within the chamber 36 enclosed by the casing 21 which are operated by an electric motor 37 located in the base portion 20. Any suitable means may be provided for imparting to the food supports the necessary movements at pre-determined intervals and one form of such means is shown in the drawings comprising the following. A pair of worm gears 38 are each centrally secured to a spindle 39 rotatably mounted and supported in the end wall of the casing 21 and the adjacent end wall of the base portion 20 which gears are so positioned as to mesh on opposite sides with a worm 40 formed on a vertical spindle 41 rotatably mounted in the top and bottom walls of the casing 21. Below the worm 40 and fastened to the spindle 41 is a worm gear 42 which meshes with a worm 43 formed on the extended end of the motor shaft 44. The spindle may have an integral enlarged portion 45 to the lower end of which the worm gear 42 may be secured in order to obtain accurate register with the motor shaft worm. By this arrangement the worm gears 38 when the motor is started are turned in opposite directions each to the other as indicated by the arrows in Figure 4 but at a much reduced speed as compared to the speed of the motor shaft. The rotation of the worm gears 38 operates the food supports through the following means: Each pivot rod 31 is extended into the chamber 36 and turned transversely at its end to form a tripping finger 47 so directed that when the food support is closed the finger is in position to be engaged at the appropriate times by a tripping member 48 secured to its respective worm gear 38 (Fig. 6) for throwing the food support outwardly and into inoperative position. For returning the supports to closed position after the food has been turned, a pair of sea-horse cams 49 are mounted on spindles 50 supported in the same manner as spindles 39 and each cam is provided with a gear segment 51 meshing with a gear segment 52 fastened to one of the pivot rods 31 so that any movement of the cam or the rod is communicated to the other of them. Each cam is so located that its nose 53 is in position to be engaged by a transverse pin 54 set in the back face of its respective worm gear 38 when the food support is in the open position shown in Fig. 4.

To start the toasting as soon as the food has been placed in the supports and the same have been manually turned to closed position (Fig. 6), I provide means whereby the circuit is closed by said movement of the food supports, one form of which comprises the following. A contact bar 56 is movably supported by its two depending pins 57 on two brackets 58 and 59 of insulating material fastened by screws 60 to the end wall of the base 20 and the brackets carry contacts 61 and 62 respectively connected to conductors 63 and 64 respectively. When the contact bar is in engagement with both contacts the circuit is closed but normally the bar is held in an open position and away from said contacts by two helical springs 65 arranged one on each of said pins 57. In order to depress said contact bar and close the circuit by closing the two food supports, the tail-portion 66 of each sea-horse cam is bent laterally to engage the insulated top face of the contact bar and press it downwardly when the food support is turned to closed position (Fig. 6). This requires the closing of both food supports otherwise the spring 65 at the open food support side will hold that end of the contact bar away from its respective contact and keep the circuit open. To hold the contact bar in closed position when the food supports are thrown outwardly to turn the food, two cams 67 are secured, one on each worm gear spindle between the gear and the tripping member which cams are circular in outline with a flattened portion 68 which portion permits the contact bar to be moved to open position to break the circuit at the conclusion of the toasting operation and after the food supports have been thrown out. During the turning of the food and until one complete revolution of the worm gears is accomplished the cams maintain a closed circuit.

For regulating the speed of the toasting operation a rheostat or resistance coils 70 may be included in the circuit which may be controlled by a lever 71 extending outwardly through a slot 72 in the end plate (Figs. 1 and 2). Preferably the motor is included in the heating coil circuit but this is not necessary since it may be placed in a separate circuit if desired. The toaster may be connected to an operating circuit either a power circuit or a lighting circuit in the ordinary way by a cord and plug and for this purpose is provided with a plug receptacle 73 at one end (Fig. 2).

The operation of the double toaster is as follows. If it is connected to the operating circuit, then the food supports should be in open position as illustrated in Fig. 4 which shows the starting position of the food support operating mechanism but it may be loaded in the first instance, the supports closed and the plug inserted whereupon the toasting operation starts. It will probably be preferable, however, to insert the plug first with the food supports open, then load and close them. The turning of the loaded food supports to closed position (Fig. 6) causes the sea-horse cams to depress the contact bar and thereby to close the circuit which starts the motor and the heating coils in operation. The worm gears 38 then begin to turn slowly in the direction indicated and the ends 75 of the tripping members 48 turn toward the tripping fingers 47 of the food support pivot rods shown in Figure 6. When the fingers 47 are engaged by members 48 the food supports are thrown outwardly beyond a vertical line and then drop by force of gravity to the position in Fig. 4. In accomplishing this result the ends 75 of the tripping members move through a very small arc because gravity is responsible for the greater part of the arc of movement of the food supports. During this movement the sea horse cams 49 change their positions from those shown in Fig. 6 to those of Fig. 4 in which position they are engaged by the pins 54 on the worm gears 38 and the onward movement of those gears then returns the said cams to their original position closing the food supports. The pins 54 are so located on the worm gears that there is no appreciable lapse of time after the food supports reach a fully open position before they start to return. The opening movement due to gravity is rapid but the closing action is slow. In Fig. 6 which shows the positions of the various parts at this time, the food supports have been returned to toasting position and the pins 54 are just disengaging from the noses of the sea horse cams.

The operation of turning the toast is illustrated progressively in Figures 8 to 10 inclusive. In the first of these figures, the toast 77 and food support are shown in toasting position in full lines but in broken lines the support has just been tripped and is falling under the force of gravity. When the support is tripped outwardly the toast which is slanted inwardly remains in that position and as the support falls the bottom of the toast is pulled outwardly by its engagement with the shelf of the support and then being unsupported slides downwardly on the support in the manner illustrated in full lines in Fig. 9. The outward impetus given the bottom of the toast by the tripping of the support causes it to slide quickly and to come to rest against the top flange of the support as shown by the broken lines in said figure. The food support is then immediately returned and carries the toast supported by the shelf upwardly into toasting position but with its untoasted face presented to the heating coils.

The continued revolution of the worm gears and tripping members finally cause the ends 76 of the latter again to trip the food supports to inoperative position where they remain. On this final tripping the contact bar is released by the tails of the sea-horse cams but the cams 67 still continue to hold it down until the tripping members have reached their starting points for the next toasting operation.

It will be observed that the tripping members are mounted eccentrically with respect to their axes of turning. I have found that the time required for toasting the first side of the food is slightly in excess of the time necessary for the second side and this difference in time is attained by mounting the tripping members in that manner. The toasting operation may be varied within certain limits by moving the lever controlling the resistance coils in order to conform to varying conditions of the food and to attain different results.

After one toasting operation is completed the food supports remain in open position and the toast may be removed therefrom at the convenience of the operator and the device remains inoperative until reloaded and the food supports are again closed by the operator.

In Figures 12 to 18 inclusive is illustrated another embodiment of my invention in the form of a single toaster which accommodates but one slice of food at a time and toasts both sides of it simultaneously. In this form the general principle of construction and operation is the same as the double toaster with the exception that the mechanism for turning the food is eliminated.

Referring to said figures the frame of the single toaster comprises a rectangular base portion 80 supporting two upright heating sections connected together at the rear ends, each of which comprises an upright plate 81 having side flanges 82 carrying a series of horizontal heating coils 83 insulated from said flanges. The two sections are separated sufficiently to receive endwise a right-angled food support 84 which is pivotally mounted between the lower outer corners of said heating sections to swing in and out between said sections. For this purpose, the food support is fixed by corner brackets 85 to a pivot shaft 86 (Fig. 17) rotatably mounted in the two plates 81. The food support may be provided with such wire grids as may be necessary for holding the food on end therein and two pairs of such, 87 and 88, are shown but more may be used if required.

The food-support may be moved pivotally through an arc of 90 degrees from the operative toasting position of Figure 16 to the inoperative position of Figure 12 and for manual manipulation is provided with a non-heat absorbing knob 89. To limit the outward movement of the support, the end 90 of its inner leg is expanded laterally as shown in Figure 15 to engage the inner faces of the front side flanges 82 when the support is out (Fig. 12) and said end may be provided with a pair of rubber cushions 91 to engage similar cushions 92 (Fig. 16) on the front side flanges to eliminate noise in operation.

For throwing out the food support at the conclusion of the toasting operation, the pivot shaft has fixed thereto a short transverse arm 94 adapted to be engaged by a tripping pin 95 carried by a gear 96 fixed to a spindle 97 rotatably mounted in the side walls of the base 80. The gear 96 is turned at a reduced speed by an electric motor 98 mounted within the base and any suitable speed reducing means may be employed such as a worm gear 99 fixed on a spindle 100 mounted in the same manner as spindle 97; the gear meshing with a worm formed on the end of the motor shaft 101 and the spindle having fixed to it a pinion 102 meshing with the gear 96. The speed reduction ratio should be such that the gear 96 will make one complete revolution for each toasting operation.

As in the case of the double toaster, I provide means operated by throwing the food support into toasting position to close the circuit to start the motor and the heating coils. A contact bar 105 similar in construction to contact bar 56 carries two depending pins 106 loosely mounted in brackets 107 fixed to the inner walls of the base 80 and is held in an uppermost position by helical springs 108 on said pins and under compression. The brackets also carry two contacts 109 and 110 connected to conductors 111 and 112. The springs 108 normally hold the contact bar out of engagement with the contacts and the circuit open but the food support is provided with a curved arm 113 for forcing the contact bar downwardly into engagement with the contacts to close the circuit when the food support has been moved to the toasting position shown in Fig. 16. To maintain the circuit closed after the food support has been started on its outward movement and the contact bar has been released by the arm 113, a cam 115 is mounted in the gear spindle 97. This cam is circular in outline and is located to hold the contact bar closed except until its flattened portion is reached after the outward movement of the support is completed when the contact bar is released and pushed upwardly by the springs 108 and the circuit broken. In Fig. 16 the parts are shown in the positions just prior to the tripping of the food support. To prevent short circuiting the contact bar and contacts are properly insulated.

Preferably, but not necessarily, the motor and heating coils are in the same circuit and for regulating the range of the toasting operation a rheostat or resistance coil 117 is included in the circuit and controlled by a lever 118 extending outwardly through a slot 119 in the rear end of the toaster which end is also provided with a plug receptacle 120 for receiving a plug 121 attached to the ordinary cord 122.

The operation of the single form of toaster is simple. If it is connected to a lighting circuit or other source of power the food support should be out as shown in Figure 12 so long as it is not being used. To start toasting a slice of bread or other food 125 is placed on end in the support and the support is turned in between the heating sections and immediately closes the circuit through the instrumentality of the curved arm 113 acting on the contact bar. The operation of the motor sets in motion the gear train to rotate the gear 96 and the toasting continues until the tripping pin 95 throws the food support out. The motor continues, however, for a short interval after the food support has been tripped to bring the parts to the starting position. After the toasting operation has been started no further attention is required and the housewife is free to remove the toast from the support at her convenience and insert another piece without mental worry as to whether the toasting is being well done.

Although I have shown both forms of toasters having each but a single circuit, it is obvious that separate circuits may be employed for the heating coils and the motor and thus keep the former in operation continuously independently of the operation of the latter. This may be desirable if the heating elements are designed to heat slowly or if they are designed to keep the toast hot on top the toaster.

The fact that the food supports are not connected to their operating mechanisms permits the supports to be opened at any time for examination of the food with the sole exception in the double toaster of the time when the supports are being moved to toasting position in the turning operation.

My invention is capable of embodiment in multiple toasters either of the single or double type and such multiple types are especially advantageous for use in restaurants and hotels where large quantities of toast are in demand. For example, the double toaster may be made with elongated food supports capable of each holding a plurality of slices or the single toaster may be constructed with a plurality of pairs of heating sections and a corresponding number of food supports, in which cases a large number of slices may be toasted simultaneously and delivered automatically.

It will be observed that the construction and operation of toasters embodying my invention are simple; that the toasters are durable and not liable to get out of order and that they may be manufactured at a low cost.

It is to be understood that my invention is not to be limited to the precise forms hereinbefore shown and described, since it may be embodied in various forms of construction all within the purview of the following claims.

What I claim is:

1. A device of the class described comprising electrically operable power means, electrically operable heating means, circuits for controlling said power and heating means including a switch, a toast support movable toward and away from the heating means, a shaft driven by said power means, means on said shaft for holding the switch closed during the toasting operation and for opening it at the end thereof, means also on said shaft through which said support is moved away from the heating means at the end of the toasting period, and means operable by said toast support for initially closing the switch as the support moves to toasting position.

2. A device of the class described comprising electrically operable power means, electrically operable heating means, circuits for controlling said power and heating means including a switch, a pair of toast supports movable toward and away from the heating means, a pair of members driven by said power means, means on each driven member for holding the switch closed during the toasting operation and opening it at the end thereof, means also on each driven member through which the corresponding support is moved away from the heating means at the end of the toasting period, and means operable by each toast support for initially closing the switch as the support moves to toasting position.

3. A device of the class described comprising electrically operable power means, electrically operable heating means, circuits for controlling said power and heating means including a switch, a pair of toast supports movable toward and away from the heating means, a pair of members driven by said power means, means on each driven member for holding the switch closed during the toasting operation and opening it at the end thereof, means on each member through which the corresponding support is moved away from the heating means at the end of the toasting period, and means operable by each toast support for moving the switch in closing direction as the support moves to toasting position, said means adapted only to close the switch when both supports are so moved.

4. An electric motor, an electric resistance heater, circuits for controlling the motor and heater including a switch, a toast support movable toward and away from the heater, a trip finger movable with and for moving the toast support, means movable with the toast support for closing the switch as the toast support moves toward toasting position, a rotatable member driven by said motor, means carried by the member for twice engaging said trip finger during one rotation of said member to move the support away from the heater and means movable with said member for operating said switch closing member and for moving said support away from toasting position, and means also movable with said member for holding the switch closed during the toasting cycle and for opening the switch at the end of said cycle.

5. An electric motor, an electric resistance heater, circuits for controlling the motor and heater including a switch, a toast support movable toward and away from the heater, a trip finger movable with and for moving the toast support, means in geared connection with the toast support for closing the switch as the toast support moves toward toasting position, a rotatable member driven by said motor, means carried by the member for twice engaging said trip finger during one rotation of said member to move the support away from the heater, and means movable with said member for operating said geared switch-closing member and for moving said support to toasting position, and means also movable with said member for holding the switch closed during the toasting cycle and for opening the switch at the end of said cycle.

6. A device of the class described comprising electrically operable power means, electrically operable heating means, circuits for controlling said power and heating means including a switch, a toast support movable toward and away from said heating means, means operable by said support for closing the switch when the support moves to toasting position, said means being adapted to operate the support, a trip finger also movable by the toast support, a member driven by said power means, a cam driven by said member for holding the switch closed during the toasting operation and for opening it at the end thereof, a trip moving with said member for engaging the trip finger to move the support away from the heating means, and means also movable with said member for moving the switch closing means to open the switch and move said support away from said heating means at the end of the toasting period.

7. A device of the class described comprising electrically operable power means, electrically operable heating means, circuits for controlling said power and heating means including a switch, a toast support having a pivot, and movable toward and away from said heating means, means in geared connection with said support for closing the switch when the support moves to toasting position, a trip finger also movable with the toast support, a member driven by said power means, a cam driven by said member for holding the switch closed during the toasting operation and for opening it at the end thereof, a trip moving with said member for engaging the trip finger to move the support away from the heating means, and means also movable with said member for moving the gear-connected switch control means to open the switch and move said support away from said heating means at the end of the toasting period.

8. A device of the class described comprising electrically operable power means, electrically operable heating means, circuits for controlling said power and heating means including a switch, a toast support movable toward and away from said heating means, means in geared connection with said support for closing the switch when the support moves to toasting position, a trip finger also movable by the toast support, a member driven by said power means, a cam driven by said member for holding the switch closed during the toasting operation and for opening it at the end thereof, a trip moving with said member for engaging the trip finger to move the support away from the heating means, and means also movable with said member for moving the gear-connected switch closing means to open the switch and move said support away from said heating means at the end of the toasting period.

9. A device of the class described comprising power means, heating means, circuits for controlling said power and heating means including a switch, a toast support movable toward and away from the heating means, means operable by the support for closing the switch when the support moves to toasting position, said means being adapted to operate the support, a trip finger also movable by said toast support, a member driven by said power means, a cam driven by said member for holding the switch closed during a toasting operation and for opening it at the end thereof, and a trip movable with said member for twice engaging the trip finger to correspondingly twice move the support away from the heating means, in one toasting operation.

10. A device of the class described comprising power means, heating means, circuits for controlling said power and heating means including a switch, a toast support movable toward and away from the heating means, means operable by the support for closing the switch when the support moves to toasting position, said means being adapted to operate the support, a trip finger also movable by said toast support, a member driven by said power means, a cam driven by said member for holding the switch closed during a toasting operation and for opening it at the end thereof, a trip movable with said member for twice engaging the trip finger to move the support away from the heating means, and means also movable with said member for moving the switch closing means to open the switch, and for moving said support away from the heating means at the end of the toasting period.

11. A toaster of the tip-and-turn type including two leaves, a motor, a switch controlling the circuit to the motor, means operable by each leaf and operable together to cause switch closure during closing motion of the leaves, including a trip finger which is disposed at tripping position when the leaves are closed, first rotatable means for each leaf operable together for holding the switch closed throughout the toasting period and during one complete revolution, second rotatable means for each leaf operable together for twice engaging the trip finger during one complete revolution to trip it to open the leaves respectively for a toast-turning operation, and at the completion of the toasting operation, third rotatable means for each leaf and operable together for returning the leaves to toasting position after a toast-turning operation, said third means acting on a portion of the switch-closing means and when acting bringing said switch-closing means to switch-closed position, and means by which the motor controls said first, second and third means.

12. A device of the class described having a support for an article to be cooked, a motor and circuit therefor including a switch, means operated by the food support for closing the switch as the support is moved to cooking position and including a finger which at that time is brought to a tripping position, a shaft and means by which the motor drives it, the shaft having a cam to only hold the switch closed during the cooking operation, and means on the shaft for engaging the trip finger to move the support away from cooking position at the end of a cooking period.

13. A device of the class described having a pair of leaves, a motor and circuit therefor including a switch, means operated by the leaves to close the switch as the leaves move to cooking position and including a finger which is brought at that time to a position for tripping, a pair of shafts and means by which the motor drives them, said shafts having means to hold the switch closed only during the cooking operation, each shaft having means for engaging the corresponding trip finger to open the leaves after cooking is completed.

14. A device of the class described having a pair of leaves of the tip-and-turn type, a motor and circuit therefor including a switch, means operated by the leaves to close the switch as the leaves are moved to cooking position and including a finger which is brought at that time to a position for tripping, a pair of shafts and means by which the motor drives them, each shaft having a cam to hold the switch closed during the cooking operation, means operable by each shaft engaging the corresponding trip finger to open the leaves respectively for tripping and turning, and after cooking is completed, and means operable by each shaft and engageable with a portion of said leaf-operated switch-closing means to return each leaf to cooking position after a tip-and-turn motion.

15. A device of the class described having a pair of leaves of the tip-and-turn type, a motor and circuit therefor including a switch, means operated by a leaf for moving the switch in closing direction as the leaf is moved to cooking position including a finger which is brought at that time to a position for tripping, said leaf-operated means adapted only to close the switch if both leaves are so moved, a pair of shafts and means by which the motor drives them, each shaft having a cam to hold the switch closed during the cooking operation, means on each shaft for engaging the corresponding trip finger to open the leaves respectively for tipping and turning and after cooking is completed each shaft having means engageable with a portion of the corresponding leaf-operated switch-closing means to return each leaf to cooking position after a tip-and-turn motion.

GEORGE L. LAWRENCE.